(No Model.)

M. SCHLOSS.
COAT.

No. 379,032. Patented Mar. 6, 1888.

WITNESSES:
R. L. Clemmitt.
John E. Morris.

INVENTOR:
Michael Schloss

BY Chas B. Mann
ATTORNEY.

UNITED STATES PATENT OFFICE.

MICHAEL SCHLOSS, OF BALTIMORE, MARYLAND.

COAT.

SPECIFICATION forming part of Letters Patent No. 379,032, dated March 6, 1888.

Application filed November 29, 1887. Serial No. 256,395. (No model.)

*To all whom it may concern:*

Be it known that I, MICHAEL SCHLOSS, a citizen of the United States, residing at Baltimore, in the State of Maryland, have invented certain new and useful Improvements in Coat-Collar Fasteners, of which the following is a specification.

My invention relates to an improvement for fastening the collars of gentlemen's coats, and it may also be applied to vests. It is illustrated in the accompanying drawings, in which—

Figure 1:
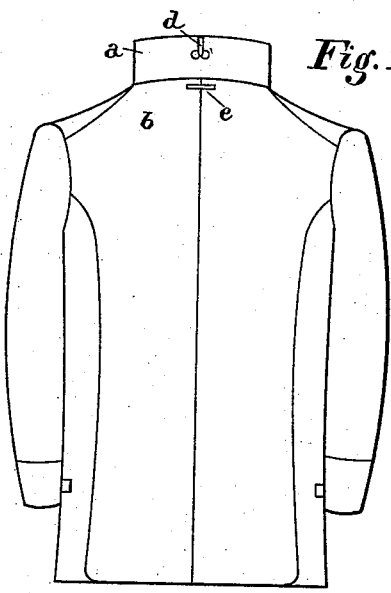
Figure 2:
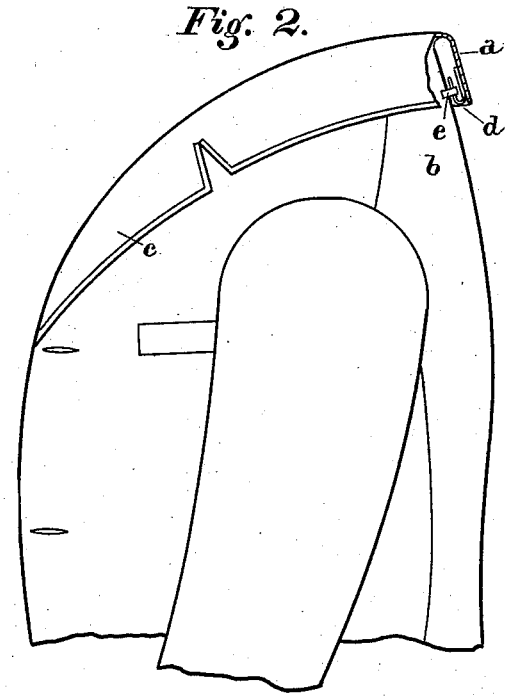

Figure 1 is a view of the back of a coat with the collar turned up and showing my improvement. Fig. 2 is a side view of a coat (larger scale) in which a portion of the collar at the rear is broken away to show the fastening.

Coat-collars are permanently attached to or integral with the coat-body, and are folded over and pressed, so as to retain a certain position suited to that it would have when on the person and buttoned up to leave a short roll of the collar-lapel on the breast. While the collar-lapel $c$ retains the short roll, as in Fig. 2 of the drawings, the collar $a$ will remain in its proper position; but if the coat is unbuttoned and the collar-lapel has a long roll extending down the coat-front then the rear part of the collar $a$ will full up or flare and leave its normal position. Another difficulty with ordinary coat-collars is that they become disarranged when putting on an overcoat. The desideratum is a fastening for the coat-collar, which, when the latter is folded over, will keep it in its proper position at all times.

The letter $a$ designates an ordinary coat-collar permanently attached to the coat-body $b$, and $c$ is the lapel or extension of the collar down the breast-front. My improvement consists in providing a hook-and-eye fastening, $d$ $e$, at the rear of the collar to retain it in its proper position. In the present instance the hook $d$ is attached to the under surface of the coat-collar $a$, and the eye or loop $e$ is attached to the coat-body at or near its central back-seam, as shown, and in position to be hid by the collar. The hook is secured to the central under surface of the undetachable collar and in line with the eye.

It is immaterial what kind of an eye or loop $e$, is employed. It may consist of metal, silk, thread, or any other material.

It will be seen that when the coat-collar $a$ is folded over to its position the hook $d$ may be engaged with the eye $e$, and thereby the collar will be kept in the same position when the lapel $c$ has either a long or short roll.

The relative position of the hook and eye may be reversed—i. e., the hook $d$ may be attached to the coat-body and the eye $e$ to the collar.

I am aware that it is not new to secure a detachable collar by means of hooks and eyes to the body of a coat or other garment, and such I do not claim, broadly.

Having described my invention, I claim and desire to secure by Letters Patent of the United States—

A coat provided with an undetachable collar having a hook secured to its central under face, and the body of the coat having an eye secured in contact with its central back-seam, said collar being adapted to fold on the body of the coat, so that said hook engages said eye, as shown and described, and for the purpose set forth.

In testimony whereof I affix my signature in the presence of two witnesses.

MICHAEL SCHLOSS.

Witnesses:
JOHN E. MORRIS,
JNO. T. MADDOX.